US012803874B2

(12) United States Patent
Cakulev et al.

(10) Patent No.: US 12,803,874 B2
(45) Date of Patent: *Nov. 17, 2026

(54) SYSTEMS AND METHODS FOR ENHANCED SESSION MANAGEMENT POLICY INTERFACE IN A WIRELESS NETWORK

(71) Applicant: Verizon Patent and Licensing Inc., Basking Ridge, NJ (US)

(72) Inventors: Violeta Cakulev, Milburn, NJ (US); Lixia Yan, Basking Ridge, NJ (US); Shanthala Kuravangi-Thammaiah, Keller, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 185 days.

This patent is subject to a terminal disclaimer.

(21) Appl. No.: 18/784,406

(22) Filed: Jul. 25, 2024

(65) Prior Publication Data

US 2024/0380665 A1 Nov. 14, 2024

Related U.S. Application Data

(63) Continuation of application No. 18/305,513, filed on Apr. 24, 2023, now Pat. No. 12,081,405.

(51) Int. Cl.
*G06F 15/173* (2006.01)
*H04L 12/14* (2006.01)
(Continued)

(52) U.S. Cl.
CPC ...... *H04L 41/0894* (2022.05); *H04L 12/1407* (2013.01); *H04L 67/14* (2013.01)

(58) Field of Classification Search
CPC . H04L 41/0894; H04L 12/1407; H04L 67/14; H04L 67/143; H04L 47/20;
(Continued)

(56) References Cited

U.S. PATENT DOCUMENTS

| | | | | |
|---|---|---|---|---|
| 9,654,503 | B1 * | 5/2017 | Kowalyshyn | H04L 63/1425 |
| 10,674,469 | B2 * | 6/2020 | Kim | H04W 36/0022 |

(Continued)

OTHER PUBLICATIONS

"Technical Specification Group Services and System Aspects; Procedures for the 5G System (5GS); Stage 2 (Release 17)", Third Generation Partnership Project TS 23.502 V17.6.0 (Sep. 2022).

*Primary Examiner* — Suraj M Joshi
*Assistant Examiner* — Hao H Nguyen

(57) ABSTRACT

A system described herein may receive a first request to establish, modify, or remove a plurality of communication sessions between a User Equipment ("UE") and a network. The system may output, to a policy element of the network (e.g., a Policy Control Function ("PCF") or a Policy Charging and Rules Function ("PCRF")), a second request for policies associated with the UE and the plurality of communication sessions, where the second request includes a plurality of communication session identifiers that are each associated with a particular one of the plurality of communication sessions. The system may receive and enforce the requested policy information when establishing, modifying, or removing the requested plurality of communication sessions based on the received particular policy information. The system may communicate with the policy element via an enhanced interface, such as an enhanced N7 interface or an enhanced Npcf interface.

20 Claims, 10 Drawing Sheets

(51) Int. Cl.
*H04L 41/0894* (2022.01)
*H04L 67/14* (2022.01)

(58) Field of Classification Search
CPC .... H04L 65/1069; H04L 47/28; H04M 15/66; H04M 15/8228; H04M 2215/7833
See application file for complete search history.

(56) References Cited

U.S. PATENT DOCUMENTS

2018/0199398 A1* 7/2018 Dao .................... H04L 41/0806
2019/0098536 A1* 3/2019 Qiao ................. H04W 36/0016
2019/0098537 A1* 3/2019 Qiao ................. H04W 36/0033
2019/0109823 A1* 4/2019 Qiao ................... H04L 12/1407
2019/0116521 A1* 4/2019 Qiao ..................... H04W 28/06
2019/0158408 A1* 5/2019 Li ......................... H04L 12/189
2019/0166647 A1* 5/2019 Velev .................... H04W 76/12
2019/0191330 A1* 6/2019 Dao .................... H04L 12/4633
2020/0267554 A1* 8/2020 Faccin .................. H04W 12/06
2020/0367141 A1* 11/2020 Cakulev .................. H04W 4/24
2020/0383005 A1* 12/2020 Wu ........................... H04L 9/40
2021/0058780 A1* 2/2021 Yu ......................... H04W 12/08
2022/0014898 A1* 1/2022 Cakulev .............. H04L 12/1407
2022/0022089 A1* 1/2022 Zhu ..................... H04W 56/001
2022/0210698 A1* 6/2022 Ly ......................... H04L 45/302
2022/0217814 A1* 7/2022 Dhammawat ....... H04L 41/0806
2022/0386166 A1* 12/2022 Sarker ................... H04L 69/164
2023/0021904 A1* 1/2023 He .......................... H04L 69/40
2023/0049862 A1* 2/2023 Belling ............... H04L 12/1407
2023/0105896 A1* 4/2023 Bienas .............. H04W 28/0268
370/235
2023/0113519 A1* 4/2023 Fernandez Alonso .......................
H04W 76/11
370/329
2023/0114943 A1* 4/2023 Suh ..................... H04L 12/1435
370/259
2023/0164555 A1* 5/2023 Starsinic ............. H04L 65/1073
455/411
2023/0199608 A1* 6/2023 Wang .................... H04W 40/02
370/310
2023/0209490 A1* 6/2023 Zhu ....................... H04W 60/04
455/435.1
2023/0217240 A1* 7/2023 Jung ..................... H04W 8/186
455/422.1
2023/0231657 A1* 7/2023 Balmakhtar .............. H04L 1/08
370/329
2023/0239952 A1* 7/2023 Shi ...................... H04L 65/1016
370/329
2023/0247476 A1* 8/2023 Chun .................. H04L 65/1073
370/235
2023/0247548 A1* 8/2023 Qiao ................. H04W 52/0219
370/311
2023/0276391 A1* 8/2023 Qiao ..................... H04W 24/08
370/350
2023/0283569 A1 9/2023 Baer
2023/0291841 A1* 9/2023 Muñoz De La Torre Alonso .......
H04L 47/803
2023/0292398 A1* 9/2023 Song ................... H04L 12/1407
2023/0300667 A1* 9/2023 Baek ..................... H04W 28/02
370/328
2023/0300943 A1* 9/2023 Wang ................ H04M 15/8038
370/329
2023/0362305 A1* 11/2023 Kim ...................... H04M 15/66
2023/0422142 A1* 12/2023 Vakeesar ............... H04W 40/20
2024/0073996 A1* 2/2024 Chun .................... H04W 24/02
2024/0276286 A1* 8/2024 Suh ................... H04W 28/0226
2024/0340155 A1* 10/2024 Ke ........................ H04J 3/0673
2025/0016870 A1* 1/2025 Park ...................... H04W 76/20
2025/0031171 A1* 1/2025 Starsinic ............... H04W 60/04
2025/0310264 A1* 10/2025 Hu .......................... H04L 47/19

* cited by examiner

SYSTEMS AND METHODS FOR ENHANCED SESSION MANAGEMENT POLICY INTERFACE IN A WIRELESS NETWORK

CROSS-REFERENCE TO RELATED APPLICATION

This application is a Continuation of U.S. patent application Ser. No. 18/305,513, filed on Apr. 24, 2023, titled "SYSTEMS AND METHODS FOR ENHANCED SESSION MANAGEMENT POLICY INTERFACE IN A WIRELESS NETWORK," the contents of which are herein incorporated by reference in their entirety.

BACKGROUND

Wireless networks may provide connectivity between User Equipment ("UEs"), such as mobile phones, Internet of Things ("IoT") devices, and/or other types of devices, and a network and/or other devices. Different UEs may be associated with different policies or parameters, such as Quality of Service ("QoS") parameters, networks via which UEs are permitted to communicate, services that UEs are authorized to receive, and/or other types of policies or parameters. When establishing communications with a UE, one or more elements of the network, such as a Policy Control Function ("PCF"), a Policy Charging and Rules Function ("PCRF"), etc. may determine such policies or parameters, such that the policies or parameters may be enforced with respect to the UE.

DETAILED DESCRIPTION OF EXAMPLE EMBODIMENTS

The following detailed description refers to the accompanying drawings. The same reference numbers in different drawings may identify the same or similar elements.

A wireless network may include one or more session management elements, such as a Session Management Function ("SMF"), a Serving Gateway ("SGW"), or other type of network function ("NF"), device, or system, that facilitate the establishment, modification, and/or removal of communication sessions, such as protocol data unit ("PDU") sessions, between UEs and user plane elements (e.g., User Plane Function ("UPFs"), Packet Data Network ("PDN") Gateway ("PGWs"), or the like). As part of the establishment or modification of one or more communication sessions associated with a UE, the session management element may communicate with a policy element, such as a PCF, a PCRF, or other suitable NF, device, or system, that determines policies associated with the UE and/or the one or more communication sessions. For example, the policy element may directly or indirectly communicate with other elements of the network, such as a Unified Data Management function ("UDM"), a Unified Data Repository ("UDR"), a Charging Function ("CHF"), a Network Data Analytics Function ("NWDAF"), and/or other suitable NFs, devices, or systems, to identify applicable policies associated with the UE and/or the one or more communication sessions. Such policies may be used (e.g., by the session management element) to determine whether to establish requested communication sessions, and/or parameters associated with such communication sessions (e.g., QoS parameters, triggers or conditions based on which the communication sessions are permitted as per the policies, etc.).

In accordance with embodiments described herein, the establishment, modification, and/or removal of multiple PDU sessions may be performed in accordance with a single request to the policy element of the network. The policy element may accordingly perform reduced operations as compared to implementations in which multiple requests are provided to the policy element in response to such events. For example, instead of performing multiple communications with other network elements (e.g., a UDM, a UDR, a CHF, etc.) to identify UE information and/or other information associated with multiple communication sessions, the policy element may be able to perform a single communication or otherwise reduced communications with such other network elements. Additionally, the amount of communications between the session management element and the policy element may be reduced, thus conserving network resources and improving the efficiency of the network.

Figure 1:
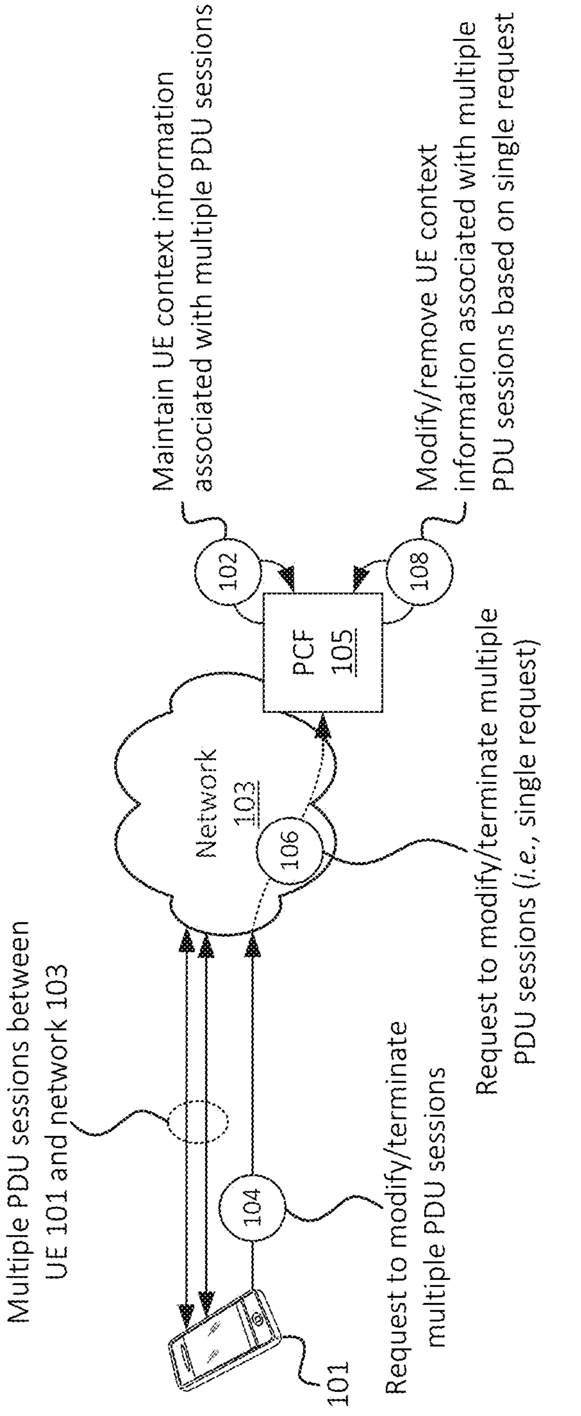
FIG. 1 illustrates an example of a single request between a session management element of a network and a policy element of a network, based on which multiple communication sessions associated with a UE may be modified.

As shown in FIG. 1, for example, assume that UE 101 is engaged in multiple communication sessions, such as multiple PDU sessions, with network 103. For the sake of brevity, communication sessions are described herein in the context of PDU sessions. In practice, similar concepts as described herein may apply to other types of communication sessions, such as Internet Protocol ("IP")-based communication sessions, user plane communication sessions, or the like. Such communication sessions may be between UE 101 and one or more user plane elements of a core of network 103, such as one or more UPFs, PGWs, etc.

A policy element of network 103, such as PCF 105, may maintain (at 102) UE context information associated with the multiple PDU sessions. For the sake of brevity, the policy element is described herein in the context of PCF 105. In practice, the policy element may include a PCRF or other suitable network function, device, or system. The UE context information may include information received, obtained, etc. by PCF 105 pursuant to an establishment of the multiple PDU sessions, as discussed below. The context information may include, for example, rules, policies, etc. that are applicable to UE 101 and the multiple PDU sessions, such as conditions under which UE 101 is authorized to communicate via the PDU sessions, permissible QoS parameters (e.g., network slice or other suitable QoS parameters) associated with the PDU sessions, locations at which UE 101 is authorized to communicate via the PDU sessions, etc. Maintaining (at 102) the UE context information may consume resources of PCF 105, such as memory resources, storage resources, etc. Maintaining (e.g., caching) the UE context information may allow for PCF 105 to provide the information to a session management element of network 103 without needing to re-obtain the information from other sources. Further, maintaining the UE context information may facilitate the updating of the UE context information by PCF 105 in the event that UE information changes (e.g., UE information maintained or provided by a UDM, UDR, NWDAF, etc.).

At some point, UE 101 may output a request (at 104) to modify or terminate some or all of the existing PDU sessions. For example, one or more applications executing at UE 101, that are associated with two or more of the PDU sessions, may terminate or may otherwise cease sending or receiving traffic via network 103. As another example, UE 101 may request a change to QoS parameters associated with two or more of the PDU sessions, such as different latency parameters or Service Level Agreements ("SLAs"), different throughput parameters or SLAs, etc. In some embodiments, the request (at 104) may include a single message sent by UE 101 to network 103 (e.g., to an Access and Mobility Management Function ("AMF") of network 103, a Mobility Management Entity ("MME") of network 103, and/or some other suitable element of network 103). In some embodiments, the request (at 104) may include multiple messages sent by UE 101 to network 103. While the request to modify or terminate the multiple PDU sessions is described in the context of being sent (at 104) by UE 101, similar concepts may apply when such a request is received from another device or system, such as a RAN to which UE 101 is connected, a device or system that is in communication with UE 101 via network 103 (e.g., an application server, a content provider, etc.), and/or where network 103 (e.g., an AMF, an MME, an SMF, an SGW, and/or other element of network 103) otherwise determines that the multiple PDU sessions should be modified or removed.

Based on the request (at 104) and/or based on otherwise determining that the multiple PDU sessions associated with UE 101 should be modified or removed, and in accordance with some embodiments, a session management element of network 103 (e.g., an SMF, an SGW, or the like) may output (at 106) a single request to PCF 105 to modify or remove the UE context information associated with the multiple PDU sessions. PCF 105 may accordingly modify or remove (at 108) the UE context information, based on the information specified in the request (e.g., an identifier of UE 101 and/or the multiple PDU sessions).

As discussed above, outputting the single request to PCF 105 may consume fewer network resources than implementations in which multiple requests are sent to PCF 105 (e.g., half the amount of messaging when the request indicates two PDU sessions, one third the amount of messaging when the request indicates three PDU sessions, etc.). Further, in situations where the request includes a modification to multiple PDU sessions, PCF 105 may perform reduced communications with other network elements, such as one set of communications with an NWDAF to retrieve updated network and/or UE information as opposed to multiple sets of communications with the NWDAF. In this manner, the efficiency of the operation of network 103 may be improved in accordance with embodiments described herein.

Figure 2:
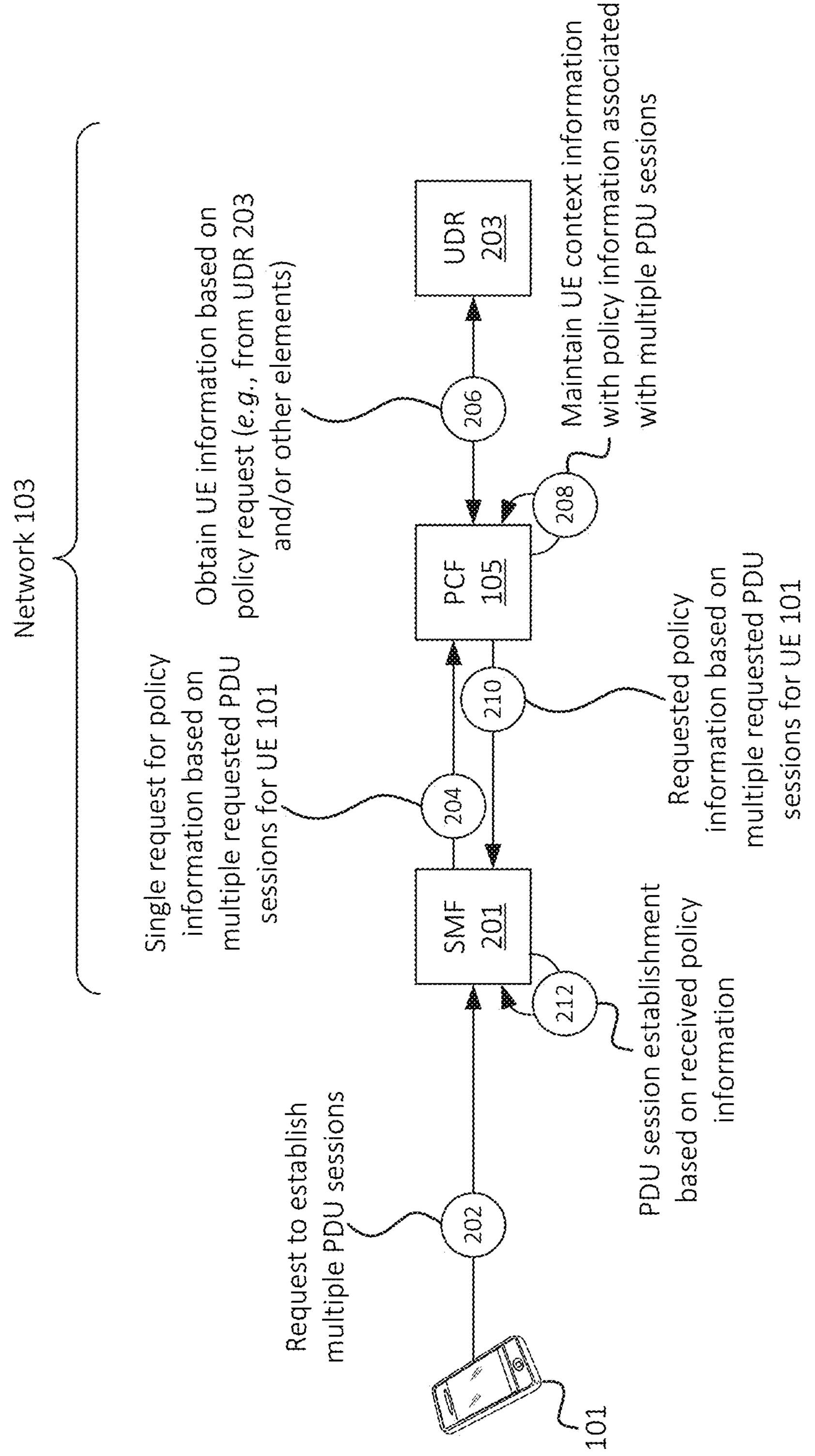
FIG. 2 illustrates an example of a single request between a session management element of a network and a policy element of a network, based on which multiple communication sessions associated with a UE may be established.

FIG. 2 illustrates an example of establishing multiple PDU sessions, such as based on a single request (at 202) from UE 101. As similarly noted above, the request may be provided by UE 101 (e.g., when UE 101 powers up, when an application executing at UE 101 requests multiple PDU sessions (e.g., which may be associated with different QoS parameters), etc.), while in other situations, another device or system may initiate the establishment of multiple PDU sessions associated with UE 101. In some embodiments, the request may be received (e.g., via an AMF, SMF, or other suitable NF, device, or system) by SMF 201. As similarly noted above, while examples are provided herein in the context of SMF 201, similar concepts may apply to operations performed by an SGW or other session management element of network 103.

In accordance with some embodiments, SMF 201 may output (at 204) a single request to PCF 105 for policy information based on the requested multiple PDU sessions. For example, SMF 201 may communicate with PCF 105 via an N7 interface, an Npcf interface, an Nsmpcf interface (e.g., an enhanced N7 interface, an enhanced Npcf interface, an enhanced Nsmpcf interface, etc. that supports the indication of multiple PDU sessions), and/or some other interface or suitable communication pathway, in accordance with some embodiments. In some embodiments, the request (at 204) may include an Npcf_SMPolicyControl_Create that includes an identifier of UE 101, PDU session identifiers associated with the requested multiple PDU sessions, attributes of the requested PDU sessions (e.g., a Data Network Name ("DNN") of each requested PDU session, QoS parameters of each requested PDU session, network slice associated with each requested PDU session, etc.), UE attributes (e.g., UE location, UE identifier such as a Subscription Permanent Identifier ("SUPI") or other identifier, etc.), and/or other suitable information. As noted above, the inclusion of information associated with the multiple requested PDU sessions in the request (at 204) may conserve network resources as compared to providing multiple requests to PCF 105, where each request is associated with one particular requested PDU session.

PCF 105 may accordingly obtain (at 206) UE information from UDR 203 and/or other suitable policy information that is applicable to UE 101 and/or the multiple requested PDU sessions (e.g., where such information may be obtained from one or more sources in addition to or in lieu of UDR 203, such as a CHF, an NWDAF, etc.). In this manner, PCF 105 may ultimately be able to determine the applicable policies for UE 101 and the multiple PDU sessions faster than if PCF 105 determined such information in a sequential or otherwise separated manner.

Once PCF 105 obtains (at 206) the information associated with UE 101 and the multiple PDU sessions, PCF 105 may maintain (at 208) UE context information that includes some or all of the obtained information. In some embodiments, the UE context information may include a session management ("SM") Policy Association. For subsequent requests for policy information (e.g., from SMF 201 and/or some other suitable NF, device, or system), PCF 105 may provide some or all of the maintained UE context information without obtaining UE information or other information from UDR 203 or another source. PCF 105 may respond (at 210) to SMF 201 with the requested policy information associated with UE 101 and the multiple PDU sessions, which may include a single Npcf_SMPolicyControl_Create response message. As noted above, the single response (at 210), associated with multiple PDU sessions, may consume fewer network resources than multiple responses that are each associated with a single PDU session.

Once SMF 201 receives (at 210) the requested policy information, SMF 201 may proceed with enforcing (at 212) the received policies. For example, SMF 201 may establish, or otherwise facilitate the establishment of, some or all of the requested multiple PDU sessions (e.g., between UE 101 and a UPF or other suitable element of network 103). In some situations, SMF 201 may reject one or more of the requested PDU sessions based on the received policies, such as in situations where conditions or attributes indicated in the received policies would be violated if such PDU sessions were to be established.

Figure 3A:
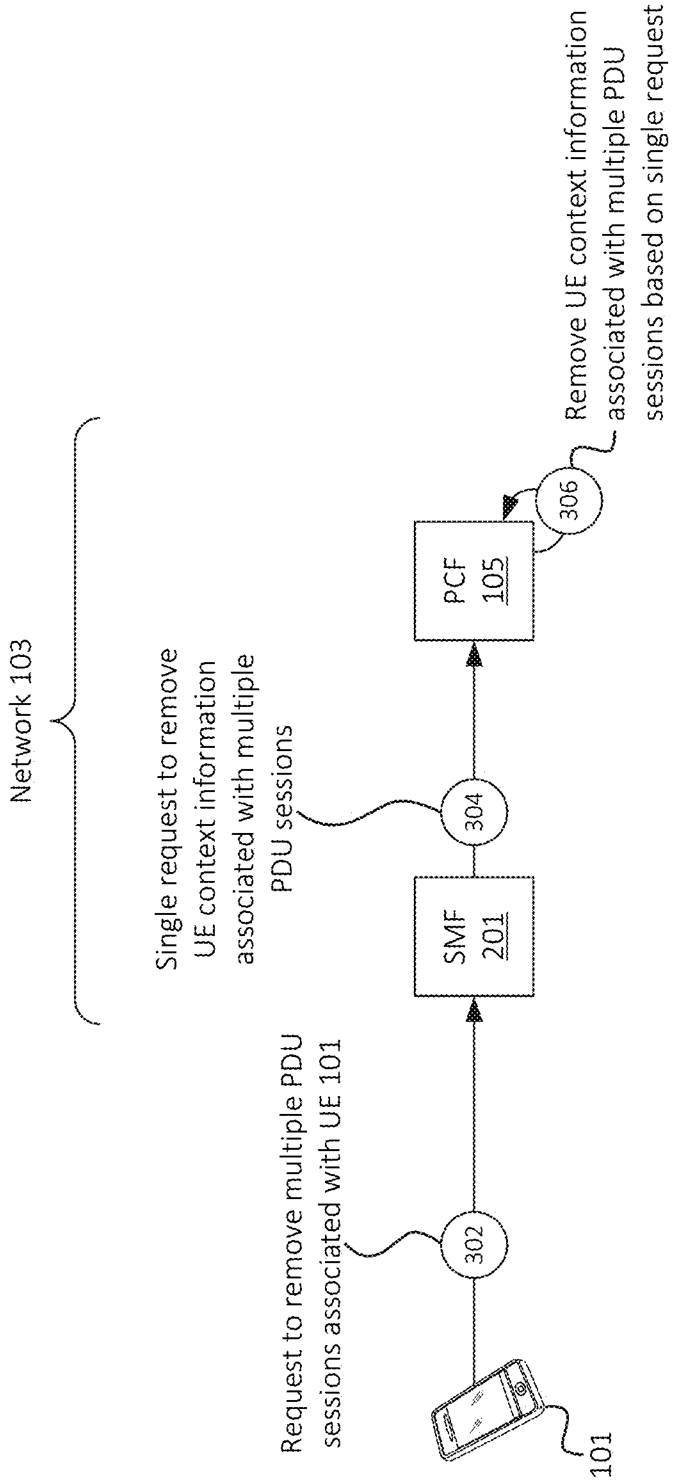
FIGS. 3A and 3B illustrate an example of a single request between a session management element of a network and a policy element of a network, based on which multiple communication sessions associated with a UE may be removed.

FIG. 3A illustrates an example of removing multiple PDU sessions associated with a particular UE 101. In this example, UE 101 may output (at 302) a request to remove multiple PDU sessions, such as when an application executing at UE 101, which is associated with the multiple PDU sessions, ceases executing or otherwise requests that the PDU sessions be removed. As such, UE 101 may output (at 302) a request to remove the multiple PDU sessions, which may include a PDU session identifier of each of the PDU sessions. Although shown in the figure as being provided from UE 101 to SMF 201, UE 101 may output the request to one or more other devices or systems, such as an AMF, an MME, etc., which may forward the request or otherwise notify (at 302) SMF 201 that the multiple PDU sessions associated with UE 101 should be removed (e.g., in order to free up network resources that are being consumed by the PDU sessions).

In accordance with some embodiments, SMF 201 may identify that the UE 101 has requested the removal of multiple PDU sessions associated with UE 101, and may output (at 304) a single request (e.g., an Npcf_SMPolicyControl_Delete message) with an indication of the multiple PDU sessions (e.g., PDU session identifiers of the PDU sessions). As noted above, the single request may consume fewer resources than multiple requests that each request the removal of a single PDU session. As additionally noted above, the request (at 304) may be provided via an N7 interface, an Npcf interface, an Nsmpcf interface (e.g., an enhanced N7 interface, an enhanced Npcf interface, an enhanced Nsmpcf interface, etc.), and/or other suitable interface between SMF 201 and PCF 105. PCF 105 may accordingly remove (at 306) the UE context information associated with the multiple PDU sessions based on the request, thus freeing up resources that were consumed by maintaining the UE context information.

Figure 3B:
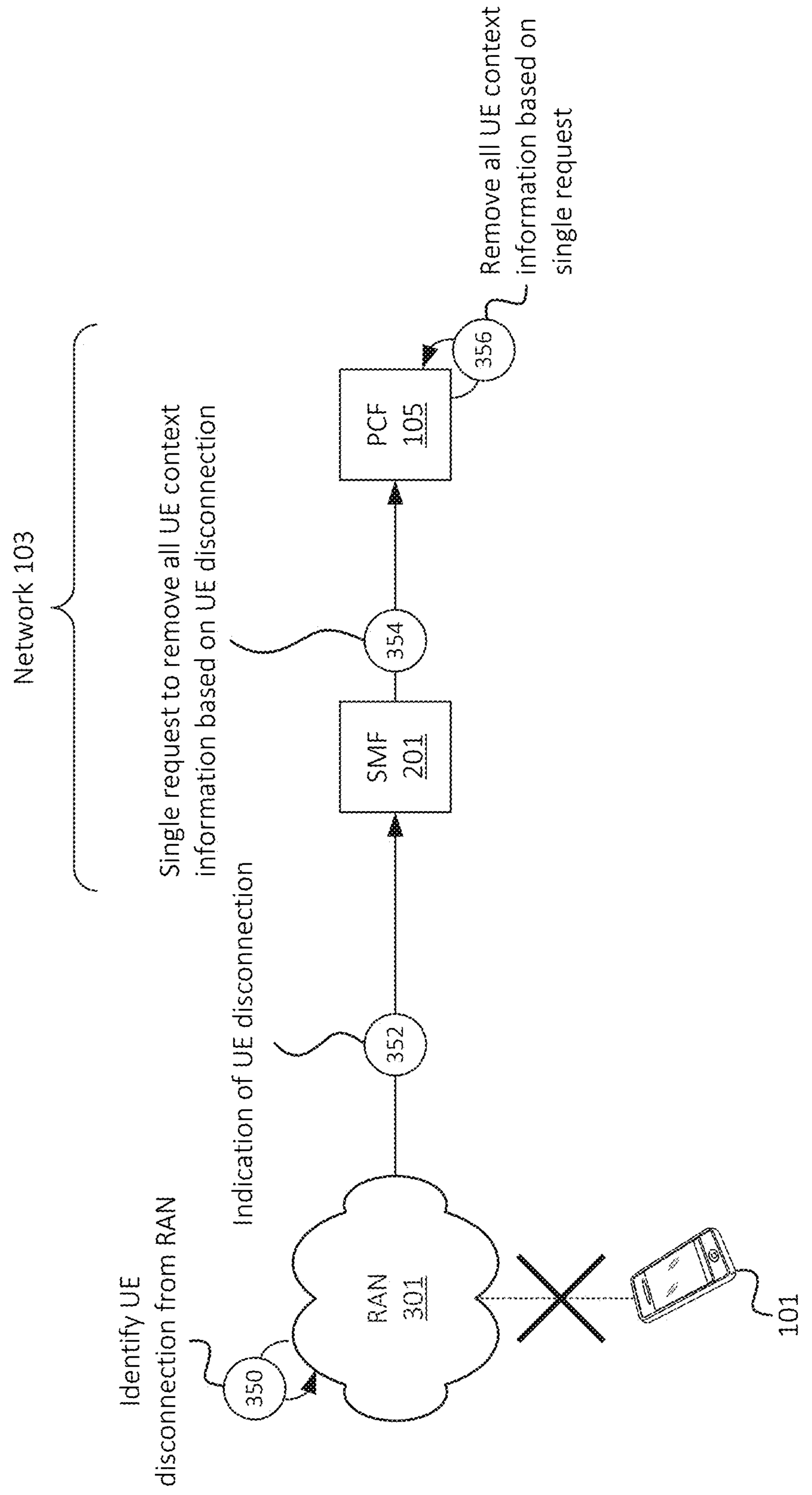

FIG. 3B illustrates another example situation in which PCF 105 may receive a single message or request indicating the removal of UE context information associated with multiple PDU sessions. For example, as shown, RAN 301, via which UE 101 wirelessly communicates with network 103, may identify (at 350) that UE 101 has disconnected from RAN 301. For example, UE 101 may power down, may connect to a different network (e.g., a WiFi network, a different RAN, etc.), may enter a location with little or no wireless coverage from RAN 301, and/or may otherwise cease communicating with RAN 301. As such, RAN 301 may output (at 352) an indication that UE 101 has disconnected from RAN 301. While this indication is shown in the figure as an indication from RAN 301 to SMF 201, SMF 201 may receive such indication (or some other indication that is derived from or is based on this indication) from one or more other NFs, devices, or systems, such as an AMF, an MME, etc. For example, RAN 301 may output a RAN release message, with an identifier of UE 101, and SMF 201 and/or one or more other devices or systems (e.g., an AMF, MME, etc.) may identify multiple PDU sessions that are associated with UE 101 (e.g., via which UE 101 communicated with network 103 prior to disconnecting from RAN 301). Based on the disconnection of UE 101 from RAN 301, SMF 201 may output (at 354) a request to remove all UE context information (e.g., associated with all PDU sessions for which PCF 105 maintains UE context information). Accordingly, PCF 105 may remove (at 356) all UE context information associated with UE 101, which may include context information associated with multiple PDU sessions, based on the single request (received at 354).

Figure 4:
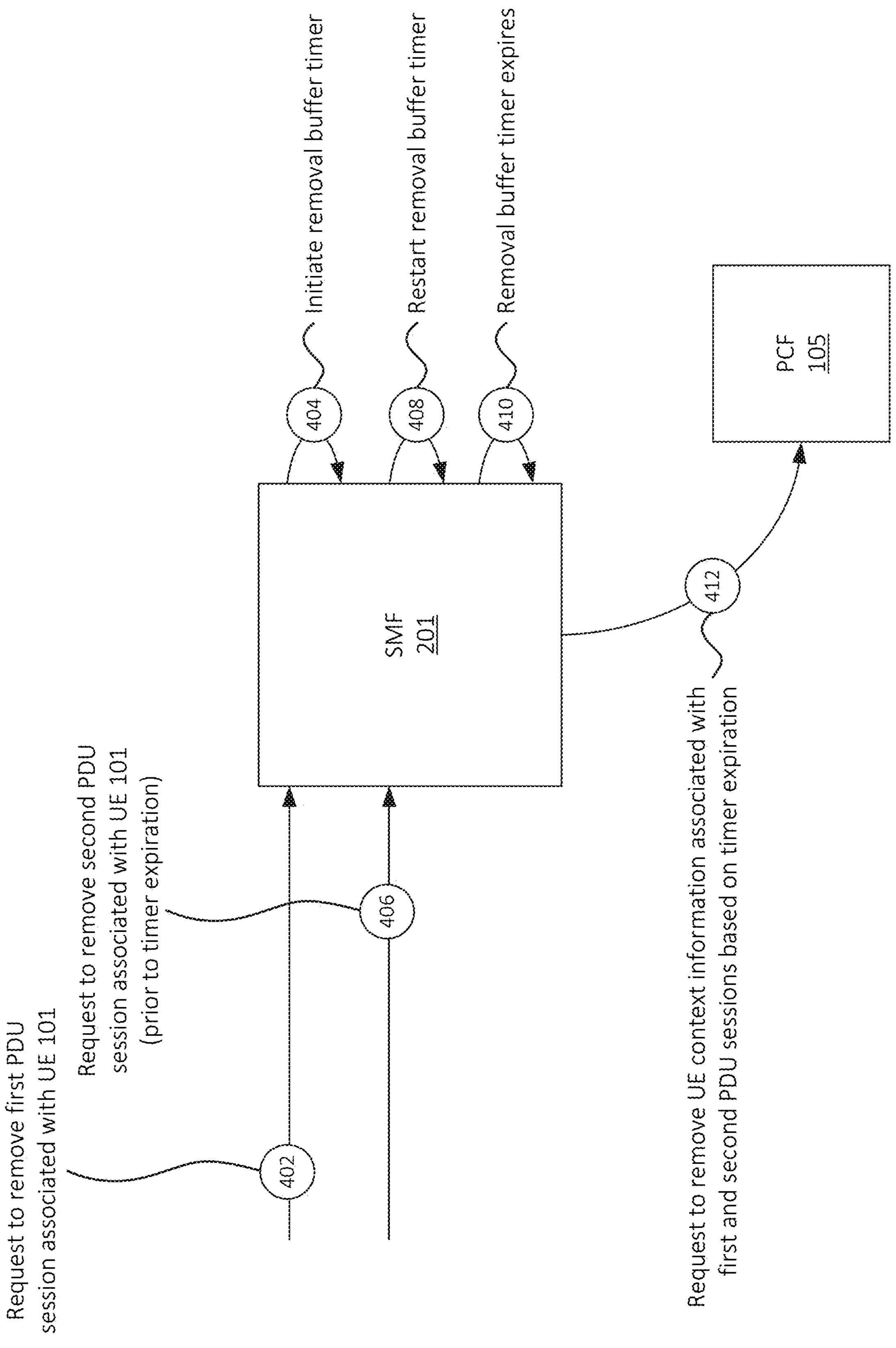
FIG. 4 illustrates an example embodiment in which a buffer timer may be used to output a single request to a policy element of a network based on non-simultaneous requests to remove multiple communication sessions associated with a UE.

In some embodiments, as shown in FIG. 4, SMF 201 may receive multiple requests to remove PDU sessions associated with a particular UE 101, where the multiple requests are non-simultaneous (e.g., are sent as separate messages). Although such requests are received by SMF 201 in a non-simultaneous manner, SMF 201 may, in accordance with some embodiments, output a single request to PCF 105 to remove context information associated with the PDU sessions, thus conserving resources as compared to outputting multiple requests to PCF 105.

For example, as shown, assume that SMF 201 receives (at 402) a request to remove a first PDU session associated with UE 101. As discussed above, the request may be received from UE 101 and/or some other suitable source. Based on receiving (at 402) the request to remove the first PDU session, SMF 201 may initiate (at 404) a timer (e.g., a removal buffer timer). Such timer may be used in order to account for situations in which multiple requests may be received in a relatively short period of time (e.g., one second, ten seconds, etc.), and based on which SMF 201 may output a single request to PCF 105 to remove the multiple PDU sessions rather than outputting multiple requests to PCF 105. In some embodiments, SMF 201 may initiate (at 404) the timer only in situations where UE 101 is associated with multiple PDU sessions (e.g., where context information maintained by SMF 201 indicates that UE 101 is associated with multiple PDU sessions), and/or only in situations where PDU sessions are to be removed. For example, in some embodiments, SMF 201 may not initiate such a timer for requests to establish or modify a PDU session, as delaying the establishment or modification of a PDU session may degrade the experience of a user of UE 101. In some embodiments, the timer may be associated with an expiration, such as one second, ten seconds, etc.

As further shown, SMF 201 may receive (at 406) a subsequent request to remove a second PDU session associated with the same UE 101. This request may be received prior to the expiration of the timer. In some embodiments, SMF 201 may restart (at 408) the timer (e.g., may reset the timer to its initial value) based on receiving the subsequent request. On the other hand, in some embodiments, SMF 201 may forego restarting (at 408) the timer when receiving the subsequent request, and may continue incrementing or decrementing the timer regardless of receiving (at 406) the subsequent requests and/or other requests. In some embodiments, in lieu of restarting (at 408) the timer, SMF 201 may add time to the timer (e.g., lengthen or prolong the expiration) by an amount that is less than restarting the timer.

After the timer has expired (at 410), which may occur after initiating (at 404) the timer and, in some scenarios, restarting (at 408) or otherwise extending the timer, SMF 201 may output (at 412) a request to remove UE context information associated with the first and second PDU sessions to PCF 105. As similarly noted above, the request may be a single request or message (e.g., an Npcf_SMPolicyControl_Create message) that includes PDU session identifiers of the first and second PDU sessions.

Figure 5:
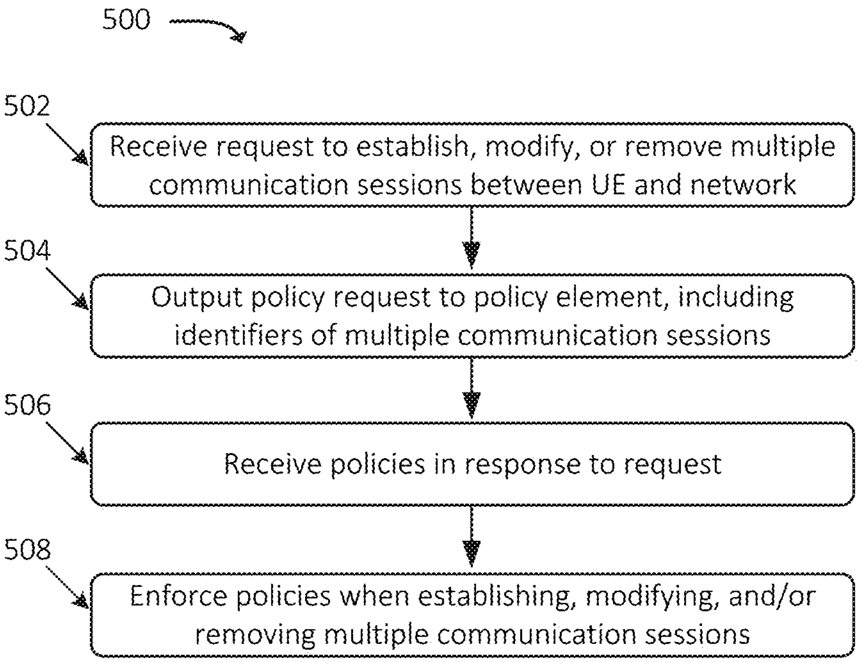
FIG. 5 illustrates an example process for obtaining policy information for multiple communication sessions via a single request, in accordance with some embodiments.

FIG. 5 illustrates an example process 500 for obtaining policy information for multiple communication sessions via a single request. In some embodiments, some or all of process 500 may be performed by SMF 201. In some embodiments, one or more other devices may perform some or all of process 500 in concert with, and/or in lieu of, SMF 201, such as an SGW and/or some other suitable NF, device, or system.

As shown, process 500 may include receiving (at 502) a request to establish, modify, or remove multiple communication sessions between UE 101 and network 103. For example, SMF 201 may receive a request from UE 101, an AMF, an MME, and/or some other suitable device or system to establish, modify, or remove multiple communication sessions (e.g., PDU sessions and/or other IP-based or user plane sessions) associated with UE 101. In some embodiments, the request may include identifiers of the communication sessions, such as PDU session identifiers. Additionally, or alternatively, SMF 201 may generate or otherwise identify such communication session identifiers, such as instances in which the request includes a request to establish multiple communication sessions.

As discussed above, the request (received at 502) may include a series of messages that are sent and/or received non-simultaneously. In some embodiments, such messages may include multiple messages that request the removal of multiple communication sessions associated with UE 101. As discussed above, SMF 201 may identify that multiple requests have been received within a relatively short period of time (e.g., prior to the expiration of a timer that is initiated after receiving a first one of the requests).

Process 500 may further include outputting (at 504) a policy request to a policy element of network 103, where the policy request includes the identifiers of the multiple communication sessions. For example, as discussed above, the policy request may be sent to PCF 105, a PCRF, and/or other suitable device or system of network 103. In some embodiments, the request may include multiple PDU session identifiers or other suitable identifiers of the above-mentioned communication sessions associated with UE 101. In some embodiments, the request may be provided via an enhanced N7 interface, an enhanced Npcf interface, an enhanced Nsmpcf interface, and/or other suitable communication pathway or interface. In some embodiments, the policy request may include and/or may take the form of a single Npcf_SMPolicyControl_Create message, a single Npcf_SMPolicyControl_Modify message, or a single Npcf_SMPolicyControl_Delete message. The policy element may identify the relevant policies (e.g., associated with UE 101 and/or the multiple identified communication sessions) based on the policy request, such as by communicating with UDR 203, a CHF, an NWDAF, and/or other suitable NF, device, or system. Additionally, or alternatively, the policy element may identify the relevant policies based on checking a local cache of the policy element. As discussed above, the use of a single message between SMF 201 and the policy element (e.g., PCF 105) may conserve network resources and time as compared to implementations in which SMF 201 issues multiple requests for policy information associated with multiple communication sessions.

Process 500 may additionally include receiving (at 506) one or more policies in response to the request. For example, SMF 201 may receive policies, conditions, parameters, etc. associated with the requested PDU sessions. Process 500 may also include enforcing (at 508) the policies. For example, the policy information may be used by SMF 201 to determine whether to allow the requested establishment, modification, and/or removal of the communication sessions. Additionally, or alternatively, the policy information may be used by SMF 201 to identify attributes (e.g., QoS parameters or other suitable attributes or parameters) of the requested PDU sessions.

Figure 6:
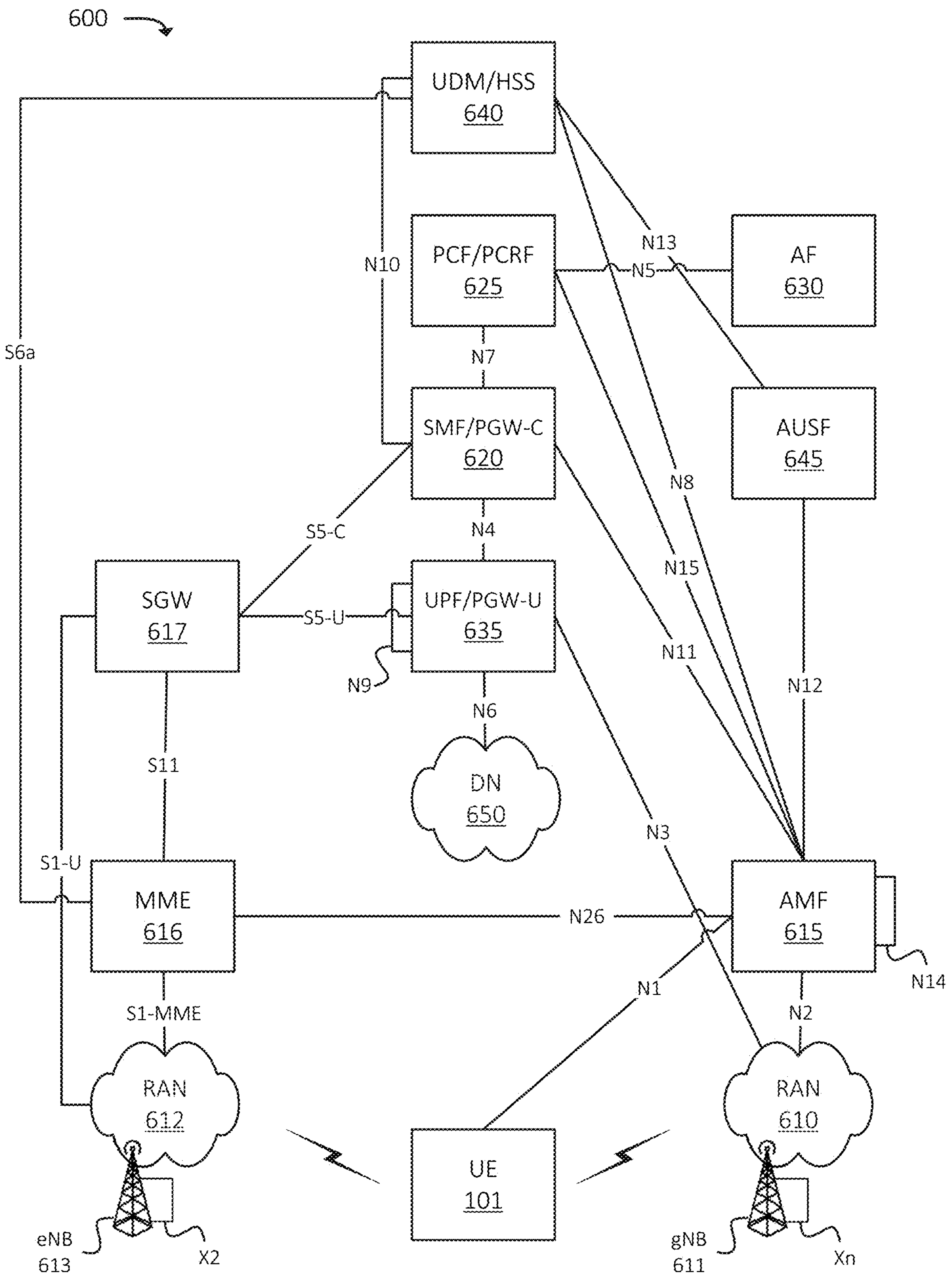
FIGS. 6 and 7 illustrate example environments in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 101, RAN 610 (which may include one or more Next Generation Node Bs ("gNBs") 611), RAN 612 (which may include one or more evolved Node Bs ("eNBs") 613), and various network functions such as AMF 615, MME 616, SGW 617, SMF/PGW-Control plane function ("PGW-C") 620, PCF/PCRF 625, Application Function ("AF") 630, UPF/PGW-User plane function ("PGW-U") 635, UDM/Home Subscriber Server ("HSS") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650).

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of AMF 615, SMF/PGW-C 620, PCF/PCRF 625, and/or UPF/PGW-U 635, while another slice may include a second instance of AMF 615, SMF/PGW-C 620, PCF/PCRF 625, and/or UPF/PGW-U 635). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 600 may be, may include, may be implemented by, and/or may be communicatively coupled to network 103.

UE 101 may include a computation and communication device, such as a wireless mobile communication device that is capable of communicating with RAN 610, RAN 612, and/or DN 650. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., user plane traffic such as voice call traffic, data traffic, messaging traffic, etc.) from UE 101 via the air interface, and may communicate the traffic to UPF/PGW-U 635 and/or one or more other devices or networks. Further, RAN 610 may receive signaling traffic, control plane traffic, etc. from UE 101 via the air interface, and may communicate such signaling traffic, control plane traffic, etc. to AMF 615 and/or one or more other devices or networks. Additionally, RAN 610 may receive traffic intended for UE 101 (e.g., from UPF/PGW-U 635, AMF 615, and/or one or more other devices or networks) and may communicate the traffic to UE 101 via the air interface. In some embodiments, RAN 301 may be, may include, and/or may be implemented by RAN 610.

RAN 612 may be, or may include, an LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 101 via the air interface, and may communicate the traffic to UPF/PGW-U 635 (e.g., via SGW 617) and/or one or more other devices or networks. Further, RAN 612 may receive signaling traffic, control plane traffic, etc. from UE 101 via the air interface, and may communicate such signaling traffic, control plane traffic, etc. to MME 616 and/or one or more other devices or networks. Additionally, RAN 612 may receive traffic intended for UE 101 (e.g., from UPF/PGW-U 635, MME 616, SGW 617, and/or one or more other devices or networks) and may communicate the traffic to UE 101 via the air interface. In some embodiments, RAN 301 may be, may include, and/or may be implemented by RAN 612.

AMF 615 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, to manage mobility of UE 101 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, to manage mobility of UE 101 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 101. In some embodiments, the establishment of communication sessions may be performed in accordance with one or more policies provided by PCF/PCRF 625. In some embodiments, SMF 201 may be, may include, and/or may be implemented by SMF/PGW-C 620.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625). In some embodiments, PCF 105 may be, may include, and/or may be implemented by PCF/PCRF 625.

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 101, from DN 650, and may forward the user plane data toward UE 101 (e.g., via RAN 610, SMF/PGW-C 620, and/or one or more other devices). In some embodiments, multiple UPFs 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, RAN 612, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. AUSF 645 and/or UDM/HSS 640 may perform authentication, authorization, and/or accounting operations associated with the subscriber and/or a communication session with UE 101. In some embodiments, UDR 203 may be communicatively coupled to UDM/HSS 640. In some embodiments, UDM 713 may be, may include, and/or may be implemented by UDM/HSS 640.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 101 may communicate, through DN 650, with data servers, other UEs 101, and/or [to] other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 101 may communicate.

Figure 7:
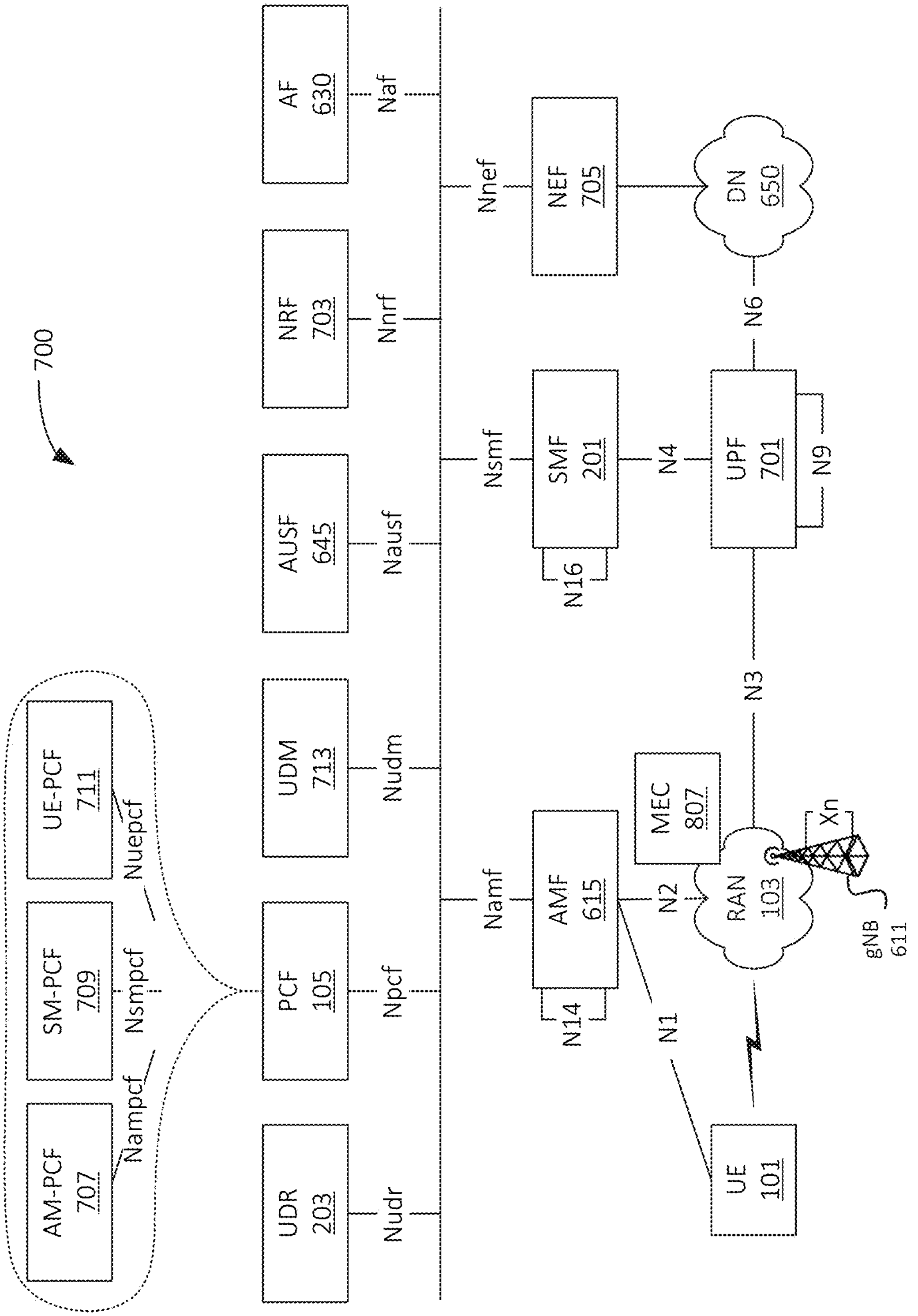

FIG. 7 illustrates another example environment 700, in which one or more embodiments may be implemented. In some embodiments, environment 700 may correspond to a 5G network, and/or may include elements of a 5G network. In some embodiments, environment 700 may correspond to a 5G SA architecture, or may correspond to a 5G NSA architecture. In some embodiments, environment 700 may include a 5GC, in which 5GC network elements perform one or more operations described herein.

As shown, environment 700 may include UE 101, RAN 301 (which may include one or more gNBs 611) and various network functions, such as AMF 615, SMF 201, UPF 701, PCF 105, UDR 203, AUSF 645, Network Repository Function ("NRF") 703, AF 630, Network Exposure Function ("NEF") 705, and UDM 713. Environment 700 may also include or may be communicatively coupled to one or more networks, such as DN 650. Environment 700 may include one or more additional devices or systems communicatively coupled to one or more networks (e.g., DN 650).

The example shown in FIG. 7 illustrates one instance of each network component or function (e.g., one instance of AMF 615, SMF 201, UPF 701, PCF 105, etc.). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 615, SMF 201, PCF 105, UPF 701, etc., while another slice may include a second instance of AMF 615, SMF 201, PCF 105, UPF 701, etc.). Additionally, or alternatively, one or more of the network functions of environment 700 may implement multiple network slices.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include interfaces shown in FIG. 7 and/or one or more interfaces not explicitly shown in FIG. 7. These interfaces may include interfaces between specific network functions, such as an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N17 interface, an N27 interface, and/or one or more other interfaces. In some embodiments, one or more elements of environment 700 may communicate via a service-based architecture ("SBA"), in which a routing mesh or other suitable routing mechanism may route communications to particular network functions based on interfaces or identifiers associated with such network functions. Such interfaces may include or may be referred to as Service-Based Interfaces ("SBIs"), including an Namf interface (e.g., indicating communications to be routed to AMF 615), an Nudr interface (e.g., indicating communications to be routed to UDR 203), an Npcf interface, an Nupf interface, an Nnef interface, an Nsmf interface, an Nnrf interface, an Naf interface, an Nudm interface, and/or one or more other SBIs.

UPF 701 may include one or more devices, systems, VNFs, CNFs, etc., that receive, route, process, and/or forward traffic (e.g., user plane traffic). As discussed above, UPF 701 may communicate with UE 101 via one or more communication sessions, such as PDU sessions. Such PDU sessions may be associated with a particular network slice or other suitable QoS parameters, as noted above. UPF 701 may receive downlink user plane traffic (e.g., voice call traffic, data traffic, etc. destined for UE 101) from DN 650, and may forward the downlink user plane traffic toward UE 101 (e.g., via RAN 301). In some embodiments, multiple UPFs 701 may be deployed (e.g., in different geographical locations), and the delivery of content to UE 101 may be coordinated via the N9 interface. Similarly, UPF 701 may receive uplink traffic from UE 101 (e.g., via RAN 301), and may forward the traffic toward DN 650. In some embodiments, UPF 701 may communicate (e.g., via the N4 interface) with SMF 201, regarding user plane data processed by UPF 701 (e.g., to provide analytics or reporting information, to receive policy and/or authorization information, etc.).

PCF 105 may include one or more devices, systems, VNFs, CNFs, etc., that aggregate, derive, generate, etc. policy information associated with the 5GC and/or UEs 101 that communicate via the 5GC and/or RAN 301. As discussed above, PCF 105 may receive information regarding policies and/or subscriptions from one or more sources, such as subscriber databases (e.g., UDR 203, a UDR, etc.), and/or from one or more users such as, for example, an administrator associated with PCF 105. In some embodiments, the functionality of PCF 105 may be split into multiple network functions, such as AM-PCF 707, SM-PCF 709, UE-PCF 711, and so on. Such different "split" PCFs may be associated with respective SBIs (e.g., AM-PCF 707 may be associated with an Nampcf SBI, SM-PCF 709 may be associated with an Nsmpcf SBI, UE-PCF 711 may be associated with an Nuepcf SBI, and so on) via which other network functions may communicate with the split PCFs. The split PCFs may maintain information regarding policies associated with different devices, systems, and/or network functions.

NRF 703 may include one or more devices, systems, VNFs, CNFs, etc. that maintain routing and/or network topology information associated with the 5GC. For example, NRF 703 may maintain and/or provide Internet Protocol ("IP") addresses of one or more network functions, routes associated with one or more network functions, discovery and/or mapping information associated with particular network functions or network function instances (e.g., whereby such discovery and/or mapping information may facilitate the SBA), and/or other suitable information.

NEF 705 may include one or more devices, systems, VNFs, CNFs, etc. that provide access to information, application programming interfaces ("APIs"), and/or other operations or mechanisms of the 5GC to devices or systems that are external to the 5GC. NEF 705 may maintain authorization and/or authentication information associated with such external devices or systems, such that NEF 705 is able to provide information, that is authorized to be provided, to the external devices or systems. Such information may be received from other network functions of the 5GC (e.g., as authorized by an administrator or other suitable entity associated with the 5GC), such as SMF 201, UPF 701, a charging function ("CHF") of the 5GC, and/or other suitable network function. NEF 705 may communicate with external devices or systems via DN 650 and/or other suitable communication pathways.

Figure 8:
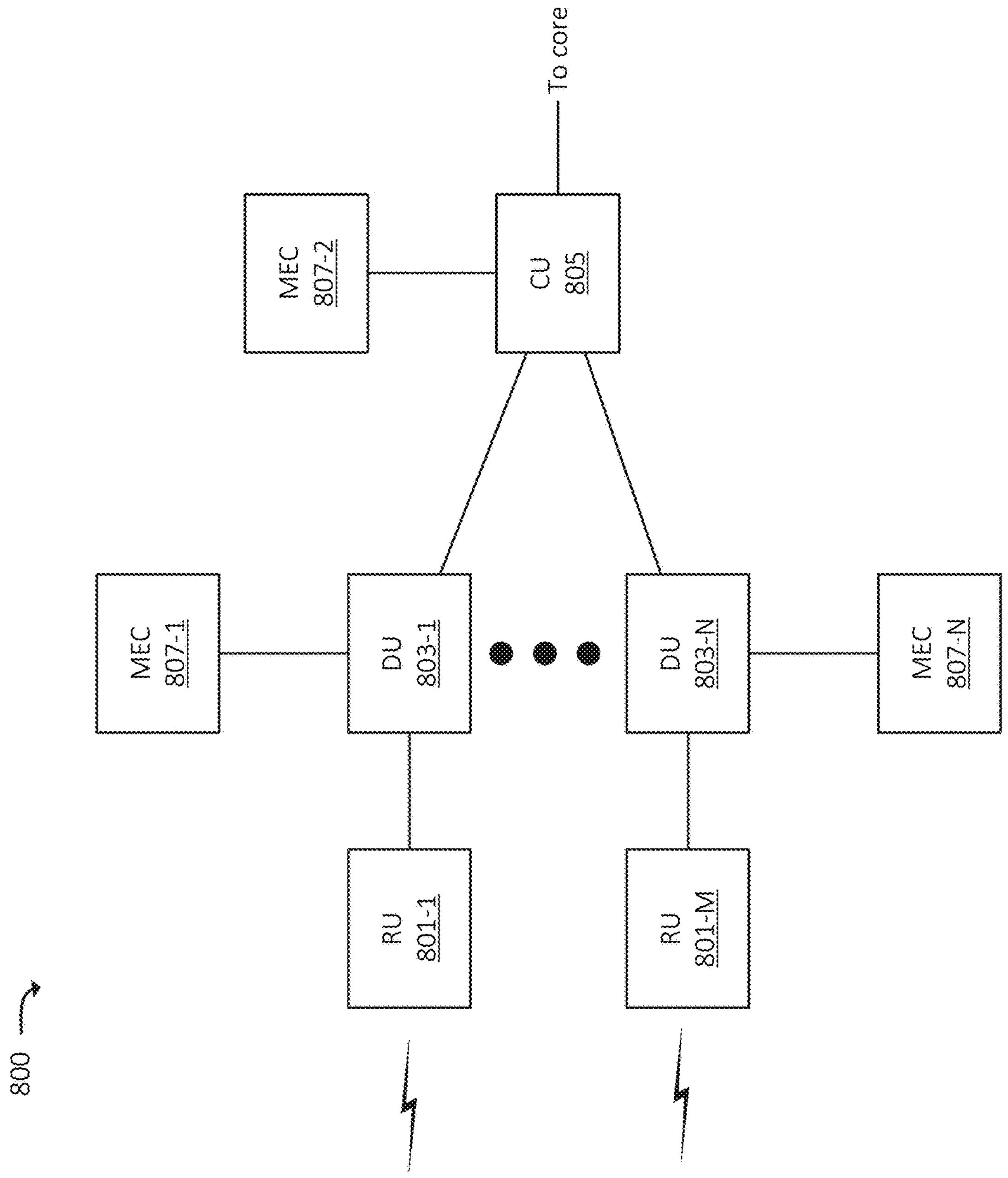
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 301, RAN 610, RAN 612, or some other RAN). In some embodiments, a particular RAN may include one RAN environment 800. In some embodiments, a particular RAN may include multiple RAN environments 800. In some embodiments, RAN environment 800 may correspond to a particular gNB 611 of a 5G RAN (e.g., RAN 610). In some embodiments, RAN environment 800 may correspond to multiple gNBs 611. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 101 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 101, and may determine which DU(s) 803 should receive the downlink traffic. DU 803 may include one or more devices that transmit traffic between a core network (e.g., via CU 805) and UE 101 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 101.

RU 801 may include hardware circuitry (e.g., one or more RF transceivers, antennas, radios, and/or other suitable hardware) to communicate wirelessly (e.g., via an RF interface) with one or more UEs 101, one or more other DUs 803 (e.g., via RUs 801 associated with DUs 803), and/or any other suitable type of device. In the uplink direction, RU 801 may receive traffic from UE 101 and/or another DU 803 via the RF interface and may provide the traffic to DU 803. In the downlink direction, RU 801 may receive traffic from DU 803, and may provide the traffic to UE 101 and/or another DU 803.

One or more elements of RAN environment 800 may, in some embodiments, be communicatively coupled to one or more Multi-Access/Mobile Edge Computing ("MEC") devices, referred to sometimes herein simply as "MECs" 807. For example, DU 803-1 may be communicatively coupled to MEC 807-1, DU 803-N may be communicatively coupled to MEC 807-N, CU 805 may be communicatively coupled to MEC 807-2, and so on. MECs 807 may include hardware resources (e.g., configurable or provisionable hardware resources) that may be configured to provide services and/or otherwise process traffic to and/or from UE 101, via a respective RU 801.

For example, DU 803-1 may route some traffic, from UE 101, to MEC 807-1 instead of to a core network via CU 805. MEC 807-1 may process the traffic, perform one or more computations based on the received traffic, and may provide traffic to UE 101 via RU 801-1. In some embodiments, MEC 807 may include, and/or may implement, some or all of the functionality described above with respect to AF 630, UPF/PGW-U 635, and/or one or more other devices, systems, VNFs, CNFs, etc. In this manner, ultra-low latency services may be provided to UE 101, as traffic does not need to traverse DU 803, CU 805, links between DU 803 and CU 805, and an intervening backhaul network between RAN environment 800 and the core network.

Figure 9:
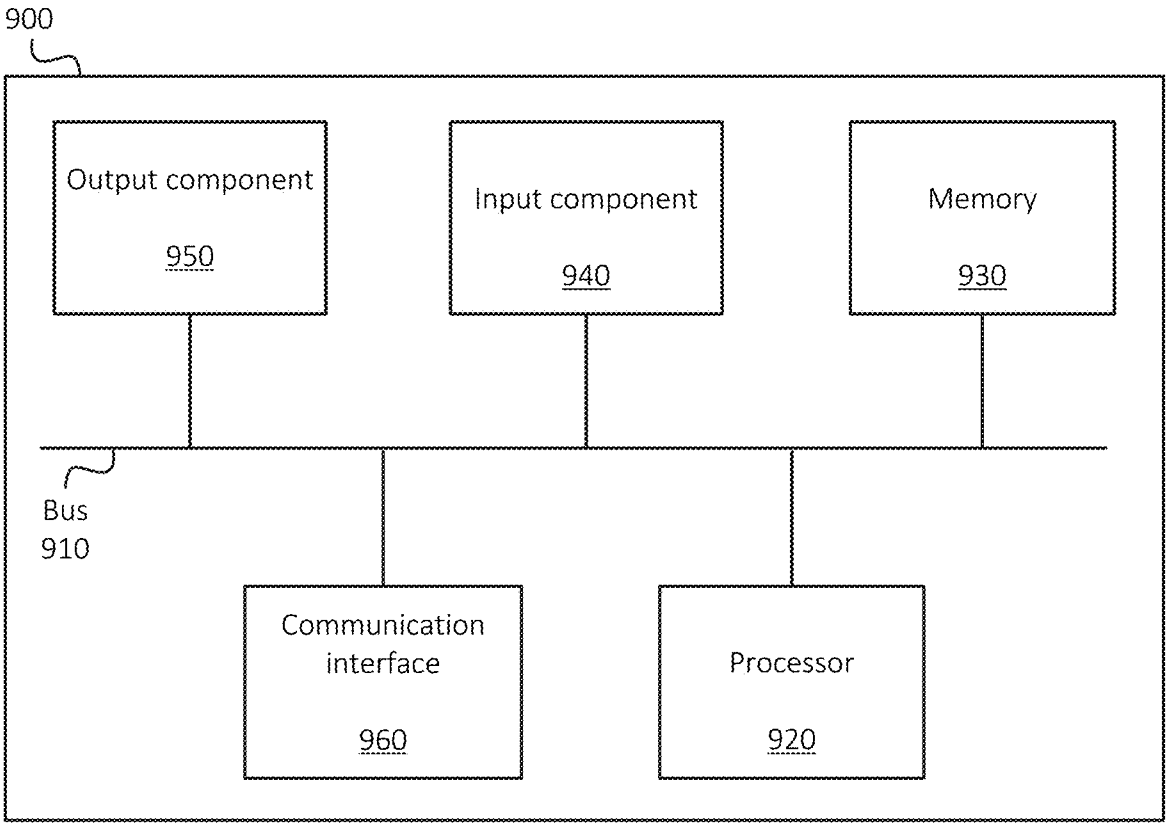
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or otherwise receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

receive a first request to remove a first communication session between a User Equipment ("UE") and a network;

determine, based on the first request being a communication session removal request, that a timer should be initiated;

initiate the timer based on receiving the first request;

output, after expiration of the timer and to a policy element of the network, a request to remove UE context information associated with the first communication session;

receive a second request to modify a second communication session between the UE and the network;

determine, based on the second request being a communication session modification request, that the timer should not be initiated;

output, based on receiving the second request and without initiating the timer, a request for policies associated with the UE;

receive, from the policy element and in response to the request for policies, particular policy information associated with the UE; and modify the second communication session based on the received particular policy information.

2. The device of claim 1, wherein the policy element includes at least one of:

a Policy Control Function ("PCF"), or a Policy Charging and Rules Function ("PCRF").

3. The device of claim 1, wherein the request for policies includes an Npcf_SMPolicyControl_Modify message.

4. The device of claim 1, wherein outputting the request for policies is performed via at least one of:

an N7 interface, an Npcf interface, or an Nsmpcf interface.

5. The device of claim 1, wherein the first communication session includes a first protocol data unit ("PDU") session, and wherein the second communication session includes a second PDU session.

6. The device of claim 1, wherein the one or more processors are further configured to:

determine if the UE is associated with a plurality of communication sessions with the network including the first and second communication sessions, wherein initiating the timer is further based on determining that the UE is associated with the plurality of communication sessions.

7. The device of claim 6, wherein the one or more processors are further configured to:

receive a third request to remove a third communication session between a second UE and the network;

determine that the third communication session is an only communication session between the second UE and the network; and output, to the policy element of the network and without initiating the timer, a request to remove UE context information associated with the third communication session, wherein the request to remove the UE context information associated with the third communication session is output without initiating the timer based on the determination that the third communication session is the only communication session between the second UE and the network.

8. A non-transitory computer-readable medium, storing a plurality of processor-executable instructions to:

receive a first request to remove a first communication session between a User Equipment ("UE") and a network;

determine, based on the first request being a communication session removal request, that a timer should be initiated;

initiate the timer based on receiving the first request;

output, after expiration of the timer and to a policy element of the network, a request to remove UE context information associated with the first communication session;

receive a second request to modify a second communication session between the UE and the network;

determine, based on the second request being a communication session modification request, that the timer should not be initiated;

output, based on receiving the second request and without initiating the timer, a request for policies associated with the UE;

receive, from the policy element and in response to the request for policies, particular policy information associated with the UE; and modify the second communication session based on the received particular policy information.

9. The non-transitory computer-readable medium of claim 8, wherein the policy element includes at least one of:

a Policy Control Function ("PCF"), or a Policy Charging and Rules Function ("PCRF").

10. The non-transitory computer-readable medium of claim 8, wherein the request for policies includes an Npcf_SMPolicyControl_Modify message.

11. The non-transitory computer-readable medium of claim 8, wherein outputting the request for policies is performed via at least one of:

an N7 interface, an Npcf interface, or an Nsmpcf interface.

12. The non-transitory computer-readable medium of claim 8, wherein the first communication session includes a first protocol data unit ("PDU") session, and wherein the second communication session includes a second PDU session.

13. The non-transitory computer-readable medium of claim 8, wherein the plurality of processor-executable instructions further include processor-executable instructions to:

determine if the UE is associated with a plurality of communication sessions with the network including the first and second communication sessions, wherein initiating the timer is further based on determining that the UE is associated with the plurality of communication sessions.

14. The non-transitory computer-readable medium of claim 13, wherein the plurality of processor-executable instructions further include processor-executable instructions to:

receive a third request to remove a third communication session between a second UE and the network;

determine that the third communication session is an only communication session between the second UE and the network; and output, to the policy element of the network and without initiating the timer, a request to remove UE context information associated with the third communication session, wherein the request to remove the UE context information associated with the third communication session is output without initiating the timer based on the determination that the third communication session is the only communication session between the second UE and the network.

15. A method, comprising:

receiving a first request to remove a first communication session between a User Equipment ("UE") and a network;

determining, based on the first request being a communication session removal request, that a timer should be initiated;

initiating the timer based on receiving the first request;

outputting, after expiration of the timer and to a policy element of the network, a request to remove UE context information associated with the first communication session;

receiving a second request to modify a second communication session between the UE and the network;

determining, based on the second request being a communication session modification request, that the timer should not be initiated;

outputting, based on receiving the second request and without initiating the timer, a request for policies associated with the UE;

receiving, from the policy element and in response to the request for policies, particular policy information associated with the UE; and modifying the second communication session based on the received particular policy information.

16. The method of claim 15, wherein the policy element includes at least one of:

a Policy Control Function ("PCF"), or a Policy Charging and Rules Function ("PCRF").

17. The method of claim 15, wherein the request for policies includes an Npcf_SMPolicyControl_Modify message.

18. The method of claim 15, wherein outputting the request for policies is performed via at least one of:

an N7 interface, an Npcf interface, or an Nsmpcf interface.

19. The method of claim 15, further comprising:

determining if the UE is associated with a plurality of communication sessions with the network including the first and second communication sessions, wherein initiating the timer is further based on determining that the UE is associated with the plurality of communication sessions.

20. The method of claim 19, further comprising:

receiving a third request to remove a third communication session between a second UE and the network;

determining that the third communication session is an only communication session between the second UE and the network; and outputting, to the policy element of the network and without initiating the timer, a request to remove UE context information associated with the third communication session, wherein the request to remove the UE context information associated with the third communication session is output without initiating the timer based on the determination that the third communication session is the only communication session between the second UE and the network.

* * * * *